(12) United States Patent
Hoefelmeyer

(10) Patent No.: US 7,937,321 B2
(45) Date of Patent: May 3, 2011

(54) MANAGED SERVICE FOR DETECTION OF ANOMALOUS TRANSACTIONS

(75) Inventor: Ralph S. Hoefelmeyer, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 166 days.

(21) Appl. No.: 11/623,551

(22) Filed: Jan. 16, 2007

(65) Prior Publication Data

US 2008/0172264 A1   Jul. 17, 2008

(51) Int. Cl.
*G06Q 40/00* (2006.01)
(52) U.S. Cl. ......................................... 705/39; 705/318
(58) Field of Classification Search .............. 705/35–45, 705/318; 726/1–36; 713/188; 455/410
See application file for complete search history.

(56) References Cited

U.S. PATENT DOCUMENTS

| | | | |
|---|---|---|---|
| 6,385,609 B1* | 5/2002 | Barshefsky et al. | 707/6 |
| 6,601,048 B1* | 7/2003 | Gavan et al. | 706/10 |
| 6,629,060 B2* | 9/2003 | Okuno et al. | 702/187 |
| 2002/0083371 A1* | 6/2002 | Ramanathan et al. | 714/37 |
| 2006/0173812 A1* | 8/2006 | Bahl et al. | 707/2 |
| 2006/0202012 A1* | 9/2006 | Grano et al. | 235/379 |
| 2006/0235725 A1* | 10/2006 | Kleen et al. | 705/2 |
| 2007/0142936 A1* | 6/2007 | Denison et al. | 700/29 |
| 2007/0174214 A1* | 7/2007 | Welsh et al. | 705/405 |
| 2008/0208946 A1* | 8/2008 | Boritz et al. | 708/517 |
| 2009/0012896 A1* | 1/2009 | Arnold | 705/39 |

OTHER PUBLICATIONS

Cleary et al., "Applying Digital Analysis Using Benford's Law to Detect Fraud: The Dangers of Type I Errors", Auditing: A Journal of Practice & Theory, vol. 24, No. 1, May 2005, pp. 77-81.*
Rose et al., "Turn Excel Into a Financial Sleuth", Journal of Accountancy, Aug. 2003, p. 58-60.*
Cho et al., "Breaking the (Benford) Law: Statistical Fraud Detection in Campaign Finance", The American Statistician, Aug. 2007, vol. 61, No. 3.*
"Overview of Fraud Detection Using Benford's Law", www.ezrstats.com/Benford.htm, Mar. 4, 2006.*
Coderre, "Audting Computer-assisted Techniques for Fraud Detection", The CPA Journal, Aug. 1999.*

* cited by examiner

*Primary Examiner* — Mary Cheung

(57) ABSTRACT

A managed service for the detection of fraud and/or anomalous transactions is disclosed. In one implementation, the managed service receives data from customers over a wide area network, the data for each customer relating to information that the customer would like monitored for anomalous transactions. The service may analyze data from the customers based on Benford's law to detect potential anomalous transactions in the data from the customers. The managed service may further report occurrences of detected potential anomalous transactions to the customer.

16 Claims, 6 Drawing Sheets

MANAGED SERVICE FOR DETECTION OF ANOMALOUS TRANSACTIONS

BACKGROUND INFORMATION

Accountants, auditors, and scientists are frequently faced with the task of locating anomalies in sets of data. Accountants and auditors, for instance, may be interested in detecting fraud in financial data. To a scientist, an anomaly in a set of data may indicate an interesting property of the system being studied or a systemic measuring error.

One existing technique for detecting anomalies in a set of data is based on Benford's law. Benford's law describes the rate at which the first few digits in a list of numbers from many real-life sources of data is expected to occur. For example, according to Benford's law, a one ("1") digit should occur in the leading digit almost one-third of the time while the digit nine ("9") should occur as a leading digit less than one time in twenty. Anomalies can be detected using Benford's law by looking at the actual distribution of first digits in a set of data and comparing it to the distribution expected based on Benford's law.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Techniques described herein may provide a managed service for the detection of fraud and/or anomalous transactions. A customer may install the service at the customer premise and may subsequently modify or configure the service by remotely accessing a managed service center.

Figure 1:
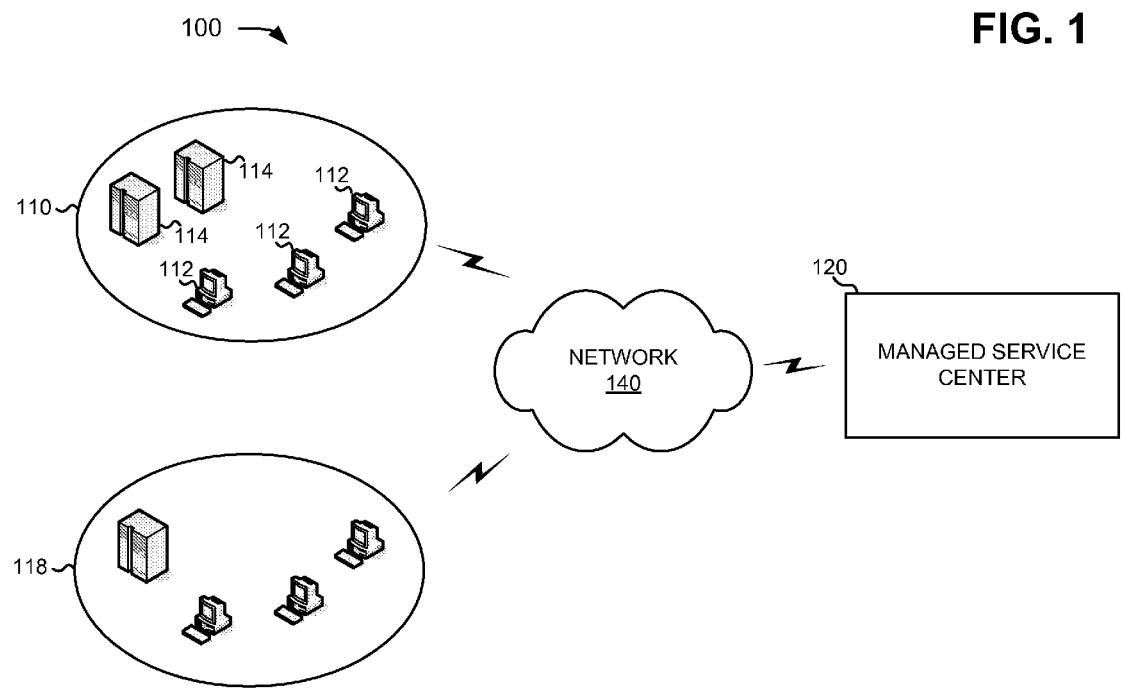
FIG. 1 depicts an exemplary system in which techniques described herein may be implemented.

FIG. 1 depicts an exemplary system 100 in which techniques described herein may be implemented. System 100 may include customer entities 110 and 118 that connect to managed service center 120 via a network 140. Entities 110 and 118 may correspond to customers that wish to use a managed service that will assist in the detection of fraud and/or anomalous transactions within the customer's organization. The customer may be, for example, a corporation or government entity that has one or more systems for which the corporation would like to obtain fraud or anomalous transaction detection service.

Customer entities 110 and 118 may each include a number of computing devices or systems. For example, customer entity 110 may include client computing devices 112, such as personal computers used by employees of customer entity 110, and server devices 114. Each of client computing devices 112 may include, for example, a personal computer, a wireless telephone, a personal digital assistant (PDA), a laptop, or another type of computation or communication device, a thread or process running on one of these devices, and/or an object executable by one of these devices. Server devices 114 may include application servers or data servers, such as servers designed to store or provide corporate data or applications used by clients 112 or by clients external to customer entity 110. Servers 114 may, for example, assist in the management of financial information, tax-related information, or other information related to the business or purpose of customer entity 110.

The number of clients, servers, and customer entities shown in FIG. 1 are exemplary. In practice, there may be more or fewer clients, servers, or customer entities.

Managed service center 120 may include a number of computing devices or systems. Managed service center 120 may generally provide managed fraud detection services to its customers. The services may be on-demand services that customers may use on an as-needed basis. Managed service center 120 may provide an interface, such as a web interface, through which customers can logon and configure aspects of their managed service. Managed service center 120 will be described in more detail below.

Network 140 may include a local area network (LAN), a wide area network (WAN), a telephone network, such as the Public Switched Telephone Network (PSTN), an intranet, the Internet, or a combination of networks. Clients 112, servers 114, and managed service center 120 may connect to network 140 via wired, wireless, and/or optical connections.

Figure 2:
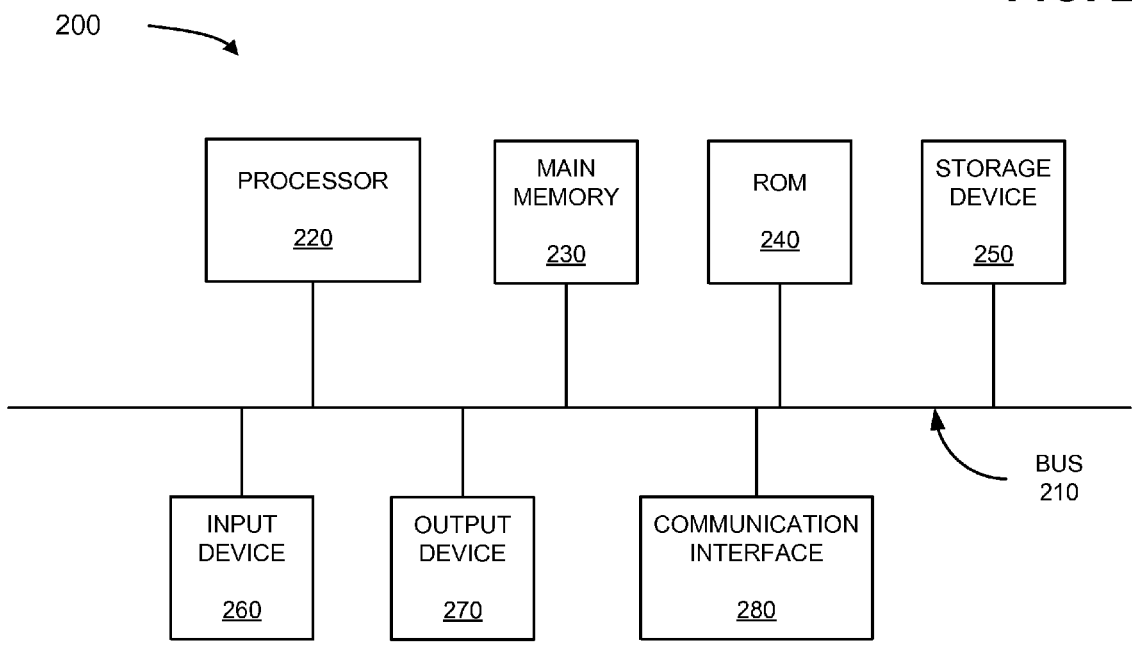
FIG. 2 is an diagram of an exemplary computing device that may correspond to a client, server, or other device shown in FIG. 1.

FIG. 2 is an exemplary diagram of a computing device 200 that may correspond to one of clients 112, servers 114, or a computing device included in managed service center 120. Computing device 200 may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information into computing device 200, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 140.

Computing device 200 may perform operations in response to processor 220 executing software instructions contained in a computer-readable medium, such as memory 230. A computer-readable medium may be defined as a physical or logical memory device.

The software instructions may be read into memory 230 from another computer-readable medium, such as storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of computing device 200, in other implementations, computing device 200 may contain fewer or additional components. In still other implementations, one or more components of computing device 200 may perform the tasks performed by other components of computing device 200.

As mentioned previously, managed service center 120 may provide a managed fraud detection and/or anomalous transaction detection service for customer entities 110 and 118. These services will be broadly referred to herein as anomalous transaction detection or anomalous transaction detection services.

Anomalous transactions may be detected based on application of Benford's law. Benford's law is a known law that states that in lists of numbers from many real-life sources of data, the leading digit is 1 almost one-third of the time, and further, larger numbers occur as the leading digit with less and less frequency as they grow in magnitude, to the point that 9 is the leading digit less than one time in twenty. Benford's law has been shown to apply to a wide variety of figures, including figures from electricity bills, stock prices, population numbers, death rates, lengths of rivers, physical and mathematical constants, and processes described by power laws. More precisely, Benford's law states that the leading digit d ($d \subset \{1, \ldots, b-1\}$) in base b ($b \geq 2$) occurs with probability proportional to $\log_b(d+1) - \log_b(d)$. Benford's law also applies to non-leading digits in a set of numbers, although the probabilities associated with the non-leading digits are less distinguished relative to a uniform probability distribution than with the first digit.

In base 10, Benford's law states that the leading digits have the distribution shown below in Table I.

TABLE I

| Leading Digit | Probability |
| --- | --- |
| 1 | 30.1% |
| 2 | 17.6% |
| 3 | 12.5% |
| 4 | 9.7% |
| 5 | 7.9% |
| 6 | 6.7% |
| 7 | 5.8% |
| 8 | 5.1% |
| 9 | 4.6% |

Not all data sets will follow Benford's Law. The data sets most likely to follow Benford's Law tend to have the characteristics that the numbers describe the sizes of similar phenomena and the numbers do not contain a built-in maximum or minimum value (such as hourly wage rates). Also, assigned numbers, such as Social Security numbers or telephone numbers, tend to not conform to Benford's law.

Techniques for using Benford's law to detect anomalous transactions are known. Generally, such techniques examine digits in a data set and compare the observed distribution in digits to the distribution predicted by Benford's law. Spikes or anomalies in the observed distribution relative to the predicted distribution may be flagged for further investigation.

Figure 3:
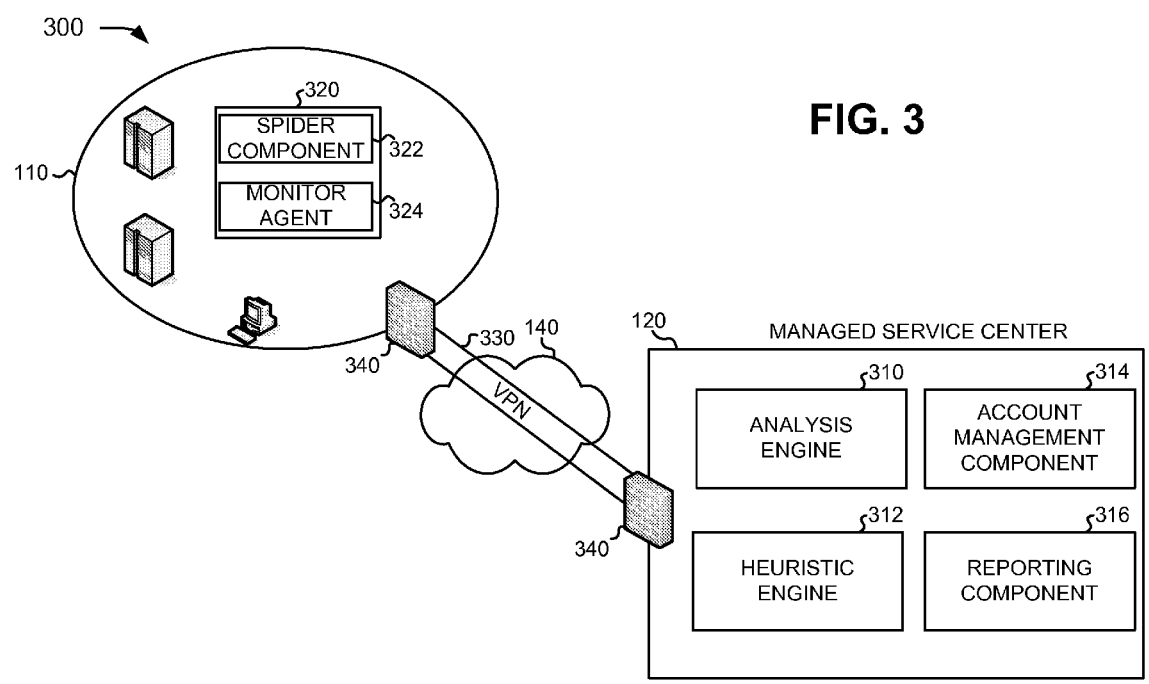
FIG. 3 is a diagram illustrating an exemplary system for providing managed anomalous transaction detection using Benford's law.

FIG. 3 is a diagram illustrating a system 300 for providing managed anomalous transaction detection using Benford's law. System 300 is similar to system 100 (FIG. 1) but includes additional details of components relating to anomalous transaction detection.

Managed service center 120 may include a number of components that may each perform functions that assist in providing anomalous transaction detection for entities, such as customer entity 110. As shown in FIG. 3, managed service center 120 may include analysis engine 310, heuristic engine 312, account management component 314, and reporting component 316. Analysis engine 310, heuristic engine 312, account management component 314, and reporting component 316 may each be implemented as one or more computing devices 200 within managed service center 120. Moreover, although managed service center 120 is shown as a single component in FIG. 3, it can be appreciated that managed service center 120 may be functionally or geographically distributed.

Heuristic engine 312 may generally operate to generate or store rules or models used to detect anomalous transactions. Heuristic engine 312 may, as an input, receive a number of different data sets, potentially from a number of different entities, such as customer entities 110 and 118. The data sets may be classified based on the type of data from which the data set was derived, such as a class for accounts payable data, a class for corporate expenses data, etc. As one example of the rules or models heuristic engine 312 may generate, heuristic engine 312 may generate threshold values based on the class of a data set and the number of samples in a data set. For example, heuristic engine 312 may determine that based on a historical analysis of a particular class of data from a number of customer entities, that when the leading digit occurs less than 20% of the time, that data set should be flagged as suspicious. This threshold value (i.e., 20%) may be used by analysis engine 310 when analyzing customer data.

Heuristic engine 312 may operate automatically to generate its rules or models based on data received from customer entities. In alternate implementations, heuristic engine 312 may be operated by or with the assistance of an administrator.

Analysis engine 310 may generally operate to analyze or assist in the analysis of data sets from customer entities for anomalous transactions. The analysis may be based on Benford's law. Analysis engine 310 may obtain parameters used in its analysis from heuristic engine 312.

Account management component 314 may generally maintain billing or other account related information for customers. As will be described in more detail below, account management component 314 may be accessed and remotely managed by the customers.

Reporting component 316 may generally provide reporting or account administrative functions relating to anomalous transaction detection. For example, reporting component 316 may provide a customer with an alert whenever a potentially anomalous transaction is detected. The alert may be provided through a web interface or through an alert mechanism that initiates contact with the customer, such as an email, phone call, page, etc. Reporting component 316 may also allow customers to change options or parameters relating to their account, such as a parameter relating to a threshold at which an anomalous transaction is reported.

System 300 may include components installed at the customer premises. For example, as shown in FIG. 3, a customer component 320 may include spider component 322 and monitor agent 324. In one implementation, customer component 320 may be a computing device, such as computing device 200, or multiple computing devices, at which spider component 322 and monitor agent 324 are installed. Customer component 320 may be implemented local to the customer, such as within the premise of customer entity 110.

Spider component 322 may generally operate to crawl or sample files or other records at customer entity 110. For example, spider component 322 may periodically determine whether any of a list of predetermined files/records has been modified since the last time the list of files was crawled and, if so, re-crawl the modified files to obtain data for a data set that is to be monitored for anomalous transactions.

In some implementations, spider component 322 may include software components that may be installed at a number of computing devices at customer entity 110. Each software component may monitor the local device at which it is installed for data of interest and transmit the data to monitor agent 324.

Monitor agent 324 may receive data from spider component 322. In situations in which spider component 322 is installed as multiple distributed processes, monitor agent 324 may aggregate data from multiple spider components. Monitor agent 324 may additionally perform an initial analysis of the data crawled by spider component 322 and may report information, such as a processed version of the crawled data, back to managed service center 120. In one implementation, monitor agent 324 and managed service center 120 may communicate through a secure communication channel, such as a virtual private network (VPN) tunnel, shown as VPN 330. In this manner, sensitive data transmitted between customer entity 110 and managed service center 120 will not be at risk of being observed. In one implementation, VPN tunnel 330 may be generated by VPN gateways 340 provided at the edges of customer entity 110 and managed service center 120.

In some embodiments, monitor agent 324 may control or monitor spider component 322. For example, monitor agent 324 may provide a graphical interface through which customer entity 110 may view the status and/or control the information collected by spider component 322.

Spider component 322 and/or monitor agent 324 may be digitally signed by managed service center 120. The digital signature may serve to verify that spider component 322 and monitor agent 324 are approved versions of software from managed service center 120. The digital signature may be also used to detect any improper alteration or modification of spider component 322, monitor agent 324, or the data collected by these components.

Because customer entity 110 may use managed service center 120 to detect fraud committed by its employees, access to spider component 322 and monitor agent 324 may be restricted to a selected subset of employees of customer entity 110. Additionally, spider component 322 may be configured to collect data in a manner that is not noticeable to the normal activity of users of computing devices at customer entity 110.

Figure 4:
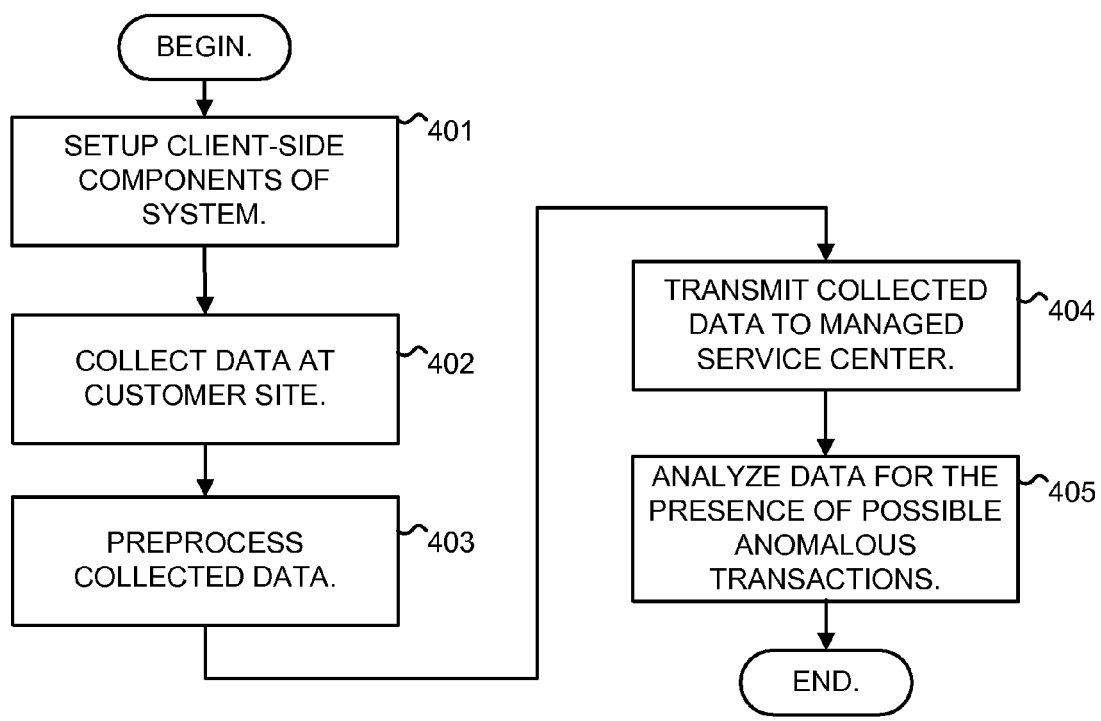
FIG. 4 is a flow chart illustrating exemplary operations for performing managed anomalous transaction detection.

FIG. 4 is a flow chart illustrating exemplary operations for performing anomalous transaction detection by system 300.

A customer, such as customer entity 110, that wishes to use the services of managed service center 120 in detecting anomalous transactions may initially setup spider component 322 and monitor agent 324 at customer entity 110. In other words, the customer may setup the client-side components of the system (act 401). For example, in one implementation, spider component 322 and monitor agent 324 may be software that customer entity 110 may download and install. In another implementation, spider component 322 and monitor agent 324 may be installed by or with the assistance of a person associated with managed service center 120.

Customer entity 110 may configure spider component 322 and/or monitor agent 324 to access the data that the customer wishes to monitor. For example, spider component 322 may include a number of different interfaces that allow spider component 322 to interact with a number of different computing devices or software programs in the local network of customer entity 110. For example, spider component 322 may be programmable to access a number of different databases that may be stored at server devices 114 and may be configured to red data in a number of different formats. As another example, spider component 322 may include a software client that can be installed at a number of personal computing devices, such as clients 112. Spider component 322 may then be configured at each client 112 to monitor select information at that client and transmit the information to monitor agent 324.

After initially setting up spider component 322 and monitor agent 324 at a customer entity, spider component 322 and monitor agent 324 may act to continuously detect and collect data at the customer site (act 402). For example, spider component 322 may collect data for one or more data sets and transmit the information to monitor agent 324. In one possible implementation, spider component 322 may transmit the collected data to monitor agent 324 without first processing the data. Alternatively, spider component 322 may first process the data, such as by only transmitting the digits needed to perform anomalous transaction detection (e.g., the first one or first few digits for an analysis based on Benford's law). Spider component 322 may also transmit information identifying the data, such as an indication of the type of information the data represents.

Monitor agent 324 may preprocess the data received from spider component 322 (act 403). For example, monitor agent 324 may perform an initial aggregation of the data based on the type of data to thereby build a data set for each type of data (e.g., a data set for account receivable information, a data set for payroll information, etc.). Additionally, monitor agent 324 may compress the data received from spider component 322.

Monitor agent 324 may transmit the data to managed service center 120 (act 404). The data may be transmitted over VPN link 330 to ensure that the security of the data is maintained.

Analysis engine 310 may receive the data from monitor agent 324 and may analyze the data for the presence of possible anomalous transactions (act 405). Analysis engine 310 may, for example, analyze the data for a particular customer entity based on Benford's law to detect data sets that are associated with a suspicious probability distribution. Analysis engine 310 may base its analysis on parameters received from heuristic engine 310. For example, analysis engine 310 may use different thresholds for determining when a data set contains anomalous transactions based on the type of data associated with the data set, the number of samples associated with the data set, or other parameters. These parameters may be received from heuristic engine 310.

Figure 5:
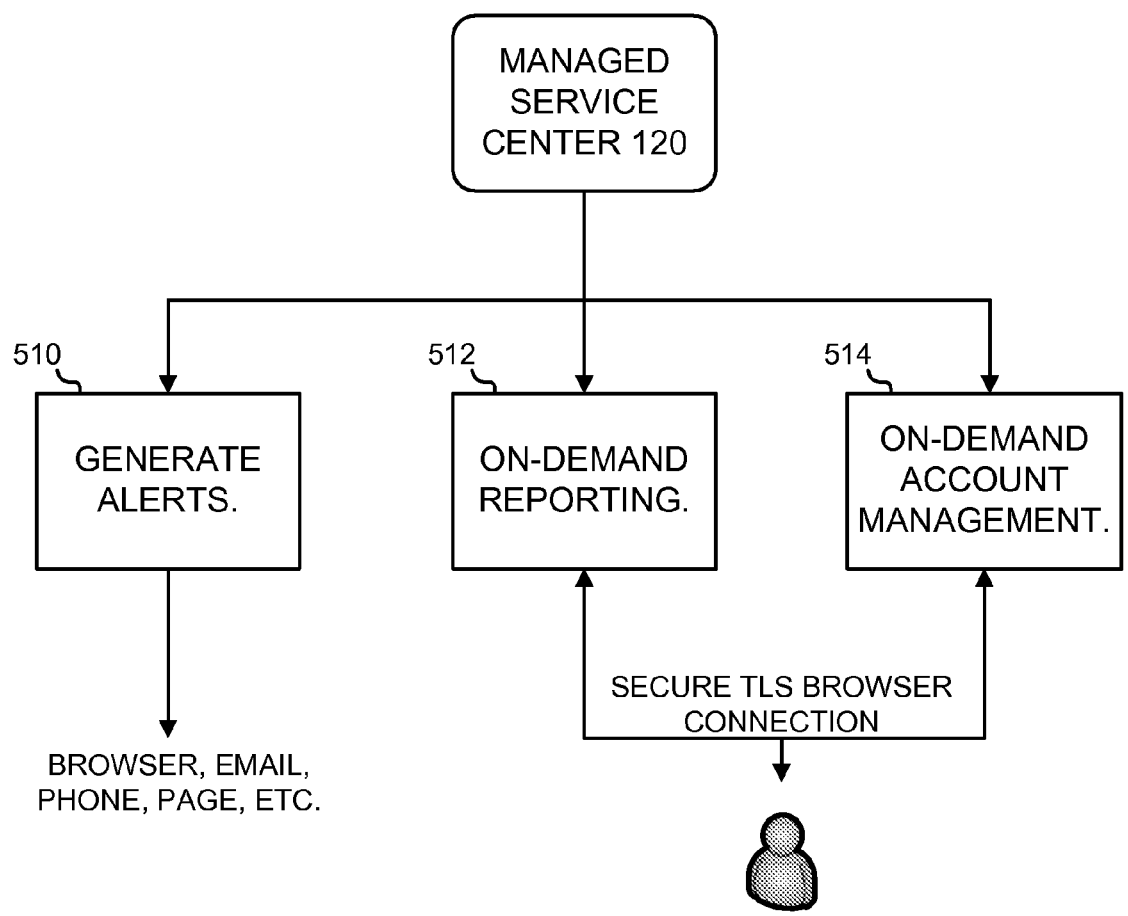
FIG. 5 is a diagram conceptually illustrating various ways in which a customer may interact with the managed service center shown in FIGS. 1 and 3.

FIG. 5 is a diagram conceptually illustrating various ways in which a customer may interact with managed service center 120.

As mentioned, managed service center 120 may analyze data sets from customers to determine whether a particular data set includes transactions that are anomalous enough to warrant further investigation. This analysis may be performed by analysis engine 310. Analysis engine 310 may continuously analyze data as it is received from monitor agent 324.

Reporting engine 316 may issue alerts generated be analysis engine 310 or when suspicious activity is detected, illustrated as generate alerts block 510 in FIG. 5. Alerts may be generated in a number of different ways. For example, a customer may receive an alert as an email message, a voice mail message, an IM message, a page, etc. A customer's preferred channel (e.g., email, voice mail, IM, or page) to use for getting alerts may be configurable by the customer. In some implementations, generated alerts may first be sent to an analyst associated with managed service center 120, who may first view the alert to determine whether any action should be taken. If so, the analyst may issue the alert. The analyst may, for instance, call the customer to inform them that additional action should be taken or initiate automated alerts for the customer, such as initiating an automated email or IM to the customer.

Managed service center 120 may also provide on-demand reporting of information relating to the analysis associated with a customer entity 110 (block 512). The on-demand reporting may be provided by reporting component 316 (FIG. 3). Reporting component 316 may, for example, provide reports to customers through a web-based browser interface. The web pages provided to the user may be provided through a secure channel, such as through web pages provided using a secure protocol such as Transport Layer Security (TLS) or Secure Sockets Layer (SSL).

The reports generated by reporting component 316 may include, for example, information relating to the type or amount of data collected by spider component 322, information relating to the results of the analysis performed by analysis engine 310, and/or historical information describing historical alerts that were generated.

Figure 6:
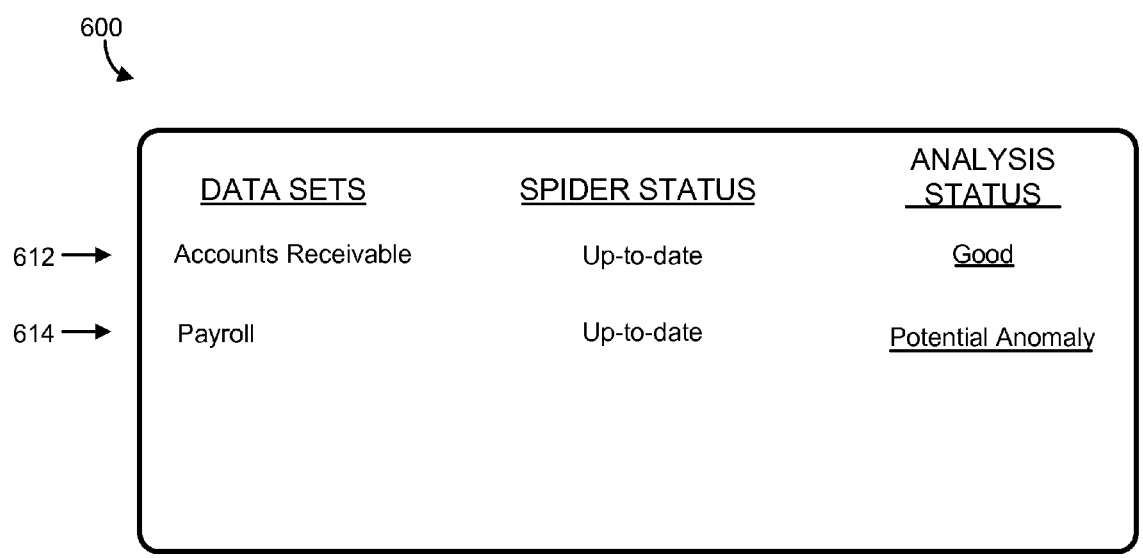
FIG. 6 is a diagram illustrating an exemplary interface that may be presented to a customer.

FIG. 6 is a diagram illustrating an exemplary graphical interface presented to a customer by reporting component 316. The graphical interface shown in FIG. 6 may, for example, be a web page 600 generated by reporting component 316 and transmitted to a client. Exemplary web page 600 provides information to a customer relating to the implementation of the anomalous transaction detection service. For example, web page 600 may provide information for each type of data being analyzed for the customer, such as a data set relating to accounts receivables and one relating to payroll information. Record 612, which corresponds to the accounts receivable information, includes a field describing the status of spider component 322 in indexing this data ("up-to-date") and a field describing the status or result of the analysis ("good"). In this example, the analysis status field may be shown as a hyperlink, through which a customer can select the link to see additional information related to the analysis status. Record 614, which corresponds to payroll information, also includes a spider status field and analysis status field. In this example, the analysis field includes the description "potential anomaly," which may indicate that anomalous data was detected in the payroll data of the customer.

Managed service center 120 may also provide on-demand account management of a customer's account, block 514 (FIG. 5). The on-demand account management may be provided by account management component 314 (FIG. 3). Account management component 314 may provide a browser interface through which the user can manage an account. The web pages may be provided to the user through a secure channel, such as through web pages provided using a secure protocol such as TLS or SSL.

Account management component 314 may, for example, allow a user to begin or end service, view a billing history for the account, define how the customer would like to be notified of alerts, or set parameters relating to the operation of analysis engine 310. In one implementation, customers may be billed based on the quantity of data monitored and the billing history provided by account management component 314 may inform the customer how much data is being monitored and/or the charges associated with that data.

In general, account management component 314 and reporting component 316 may allow a customer to remotely monitor and manage many or all aspects of their account.

The systems and methods described above provide for a managed service that can be used in detecting fraud and/or anomalous transactions at a customer site. The managed service may be an on-demand service that the customer can begin or terminate through a web interface. The managed service may be particularly applicable to, for example, accounting firms, auditors, government agencies or other entities that are involved in the detection of auditing, accounting, or tax evasion fraud. The service may be used in Sarbannes-Oxley and Gramm-Leach-Blyley compliance measures.

The managed service may also be applicable to other areas not related to finance, such as in analyzing demographic or other information for anomalies.

A customer using the managed service described herein can advantageously set-up and begin detection of anomalous transactions without making a large investment in time or infrastructure.

The foregoing description provides illustration and description, but is not intended to be exhaustive or to limit the embodiments to the precise form disclosed. Modifications and variations are possible in light of the above teachings or may be acquired from practice of the invention.

For example, while a series of acts has been described with regard to the flowchart of FIG. 4, the order of the acts may differ in other implementations. Further, non-dependent acts may be performed in parallel.

Embodiments, as described above, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for providing a service comprising:
    receiving data from a plurality of customers over a wide area network, the received data for the plurality of customers relating to information that the plurality of customers would like monitored for fraudulent transactions;
    determining a type of the received data;
    identifying at least one leading digit of the received data;

defining threshold values, based on the type of the received data being analyzed, which define an acceptable probability of occurrences of the at least one leading digit of the received data;

analyzing the data from the plurality of customers, based on an application of Benford's law and the defined threshold values, to detect potential fraudulent transactions in the received data; and reporting occurrences of detected potential fraudulent transactions to a customer, of the plurality of customers, associated with the received data in which one of the potential fraudulent transactions is detected.

2. The method of claim 1, further comprising:
providing a web interface through which the plurality of customers configures options relating to accounts of the plurality of customers.

3. The method of claim 1, where the wide-area network includes the Internet and the data is received from the plurality of customers via a virtual private network (VPN) constructed over the Internet.

4. The method of claim 1, where the data is received from the plurality of customers from software provided to the plurality customers by an operator of the service.

5. The method of claim 4, where the software provided to the plurality of customers includes:
a spider component to sample files or records of the plurality of customers.

6. The method of claim 5, where the spider component is digitally signed.

7. The method of claim 5, where the software provided to the plurality of customers further includes:
a monitor component to receive data from the spider component and to transmit the data over the wide area network.

8. The method of claim 1, where reporting occurrences of detected potential fraudulent transactions includes automatically contacting the customer via an email, instant message (IM), a page, or a telephone call, regarding the one of the plurality of transactions.

9. The method of claim 1, where the service is an on-demand service.

10. The method of claim 1, where the received data is classified based on a type of the received data, and the classification is used to define the threshold values.

11. The method of claim 1, further comprising:
billing for the analysis of the data based on a volume of the analyzed data.

12. A device comprising:
means for receiving data from a plurality of customers over a wide area network, the received data for the plurality of customers relating to information that the plurality of customers would like monitored for fraudulent transactions;

means for determining a type of the received data;
means for identifying at least one particular digit of the received data;

means for defining threshold values, based on the type of the received data being analyzed, which define an acceptable probability of occurrences of the at least one leading digit of the received data;

means for analyzing data from the plurality of customers, based on an application of Benford's law and the defined threshold values, to detect potential fraudulent transactions in the received data; and means for automatically reporting potential fraudulent transactions detected by the means for analyzing.

13. The device of claim 12, where the means for automatically reporting potential fraudulent transactions reports the potentially fraudulent transaction to an analyst associated with a service center.

14. The device of claim 12, where the data is received from the plurality of customers from software provided to the plurality customers.

15. The device of claim 14, where the software provided to the plurality of customers includes:
a spider component to sample files or records of the plurality of customers.

16. The device of claim 14, where the software provided to the plurality of customers further includes:
a monitor component to receive data from the spider component and to transmit the data over the wide area network.

* * * * *